(12) United States Patent
Wong (10) Patent No.: US 7,688,105 B2
(45) Date of Patent: Mar. 30, 2010

(54) IMPEDANCE MATCHING LOGIC

(75) Inventor: Tak Kwong Wong, Milpitas, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 62 days.

(21) Appl. No.: 12/170,012

(22) Filed: Jul. 9, 2008

(65) Prior Publication Data

US 2010/0007373 A1     Jan. 14, 2010

(51) Int. Cl.
*H03K 17/16* (2006.01)
(52) U.S. Cl. .......................................... 326/30; 326/21
(58) Field of Classification Search ................... 326/30, 326/21, 86; 327/108
See application file for complete search history.

(56) References Cited

U.S. PATENT DOCUMENTS

| | | | | |
|---|---|---|---|---|
| 6,166,576 A | * | 12/2000 | Stave | .......................... 327/266 |
| 6,292,407 B1 | * | 9/2001 | Porter et al. | ........... 365/189.11 |
| 6,459,320 B2 | * | 10/2002 | Lee | .............................. 327/310 |
| 6,541,996 B1 | * | 4/2003 | Rosefield et al. | .............. 326/30 |
| 6,828,820 B2 | * | 12/2004 | Ohno | ........................... 326/30 |
| 7,239,560 B2 | * | 7/2007 | Lee et al. | ................ 365/189.05 |

* cited by examiner

*Primary Examiner*—Vibol Tan
(74) *Attorney, Agent, or Firm*—Bever, Hoffman & Harms, LLP.

(57) ABSTRACT

An impedance matching logic generates code values that define pull-up and pull-down transistors to be enabled with output buffers. The output buffers store the code values using a two-stage latch configuration, such that updated code values are always stored within the output buffer, even if the output buffer is driving an output signal when the updated code values are received. The impedance matching logic uses previously determined code values to shorten the time required to calculate updated code values. The impedance matching logic may be operated in response to a clock signal having a frequency lower than the frequency of the output clock signal used to control the output buffers. The impedance matching logic may adjust the code values by certain percentages using a multiplication function, thereby allowing for design fine tuning (e.g., due to layout mismatch).

23 Claims, 5 Drawing Sheets

IMPEDANCE MATCHING LOGIC

FIELD OF THE INVENTION

The present invention relates to impedance matching logic for output buffer circuits.

RELATED ART

Figure 1:
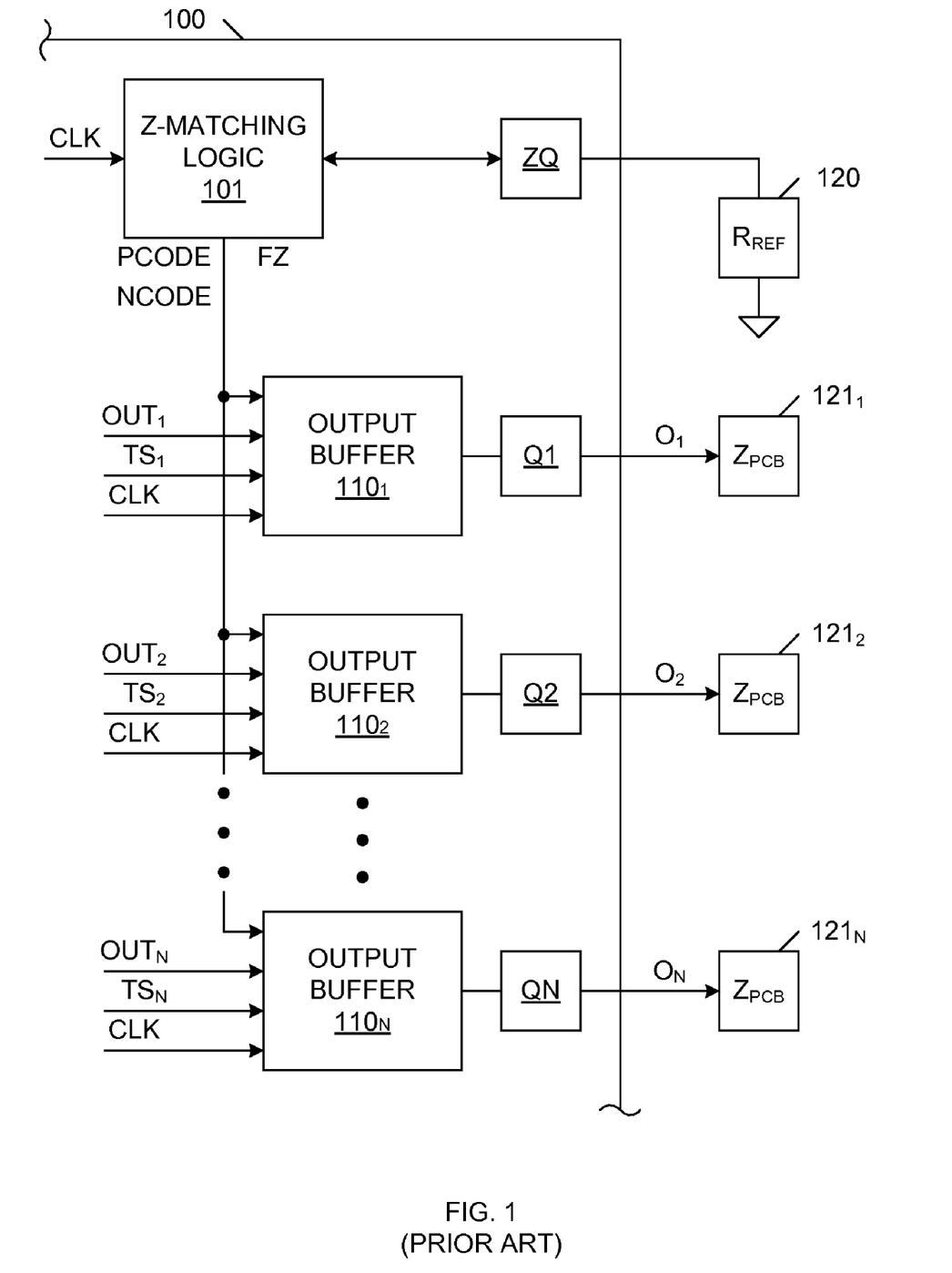
FIG. 1 is a block diagram of a conventional integrated circuit chip, which implements conventional impedance matching for the output buffers.

FIG. 1 is a block diagram of a conventional integrated circuit chip 100, which includes impedance matching logic 101, output buffers $110_1$-$110_N$, bi-directional pin ZQ and output pins Q1-QN. Impedance matching logic 101 is coupled to bi-directional pin ZQ, and output buffers $110_1$-$110_N$ are coupled to output pins Q1-QN, respectively. Each of the output pins Q1-QN is coupled to external circuitry (not shown) through printed circuit board traces $121_1$-$121_N$, wherein each of the traces has a characteristic impedance of $Z_{PCB}$. Output buffers $110_1$-$110_N$ receive respective output signals $OUT_1$-$OUT_N$, tri-state control signals $TS_1$-$TS_N$ and an output clock signal CLK, and in response, drive corresponding output signals $O_1$-$O_N$ to traces $121_1$-$121_N$ (through output pins Q1-QN, respectively). It is desirable for the pull-up and pull-down impedances of each of the output buffers $110_1$-$110_N$ to match the characteristic impedance $Z_{PCB}$ of the printed circuit board traces $121_1$-$121_N$, as such impedance matching will minimize signal reflection and ringing of the output signals $O_1$-$O_N$.

The pull-up/pull-down impedances of output buffers $110_1$-$110_N$ are matched to the characteristic impedance $Z_{PCB}$ as follows. An external resistor 120 having a resistance $R_{REF}$ is connected to bi-directional pin ZQ, wherein the resistance $R_{REF}$ has a predetermined relationship to the characteristic impedance $Z_{PCB}$. Impedance matching logic 101 includes a plurality of pull-up transistors coupled between a positive supply voltage terminal $V_{DD}$ and the bi-directional pin ZQ. Impedance matching logic 101 also includes a plurality of pull-down transistors coupled between ground and a second set of pull-up transistors (which are identical to the set coupled to pin ZQ).

Impedance matching logic 101 sequentially enables its pull-up transistors (with all of its pull-down transistors disabled), until the on-resistance of the enabled pull-up transistors approximates the resistance $R_{REF}$. Impedance matching logic 101 then sequentially enables its pull-down transistors, until the on-resistance of the enabled pull-down transistors approximates the resistance $R_{REF}$. Switching within impedance matching logic 101 is performed in response to the same output clock signal used to control output buffers $110_1$-$110_N$.

After impedance matching logic 101 has completed calculating the pull-up and pull-down transistors to be enabled to approximate the resistance $R_{REF}$, impedance matching logic stores a p-code value PCODE that identifies the enabled pull-up transistors, and an n-code value NCODE that identifies the enabled pull-down transistors. Impedance matching logic 101 transmits the stored p-code value PCODE and the stored n-code value NCODE to each of the output buffers $110_1$-$110_N$.

Each of the output buffers $110_1$-$110_N$ includes a plurality of pull-up transistors coupled between the $V_{DD}$ supply voltage terminal and the corresponding output pin, and a plurality of pull-down transistors coupled between the corresponding output pin and ground. The configuration of the pull-up and pull-down transistors in each of the output buffers $110_1$-$110_N$ is the same as the configuration of the pull-up and pull-down transistors in impedance matching logic 101. However, the sizes of the pull-up and pull-down transistors in output buffers $110_1$-$110_N$ are scaled with respect to the sizes of the pull-up and pull-down transistors in impedance matching logic 101, in view of the relationship that exists between the resistance $R_{REF}$ and the characteristic impedance $Z_{PCB}$.

The p-code value PCODE provided by the impedance matching logic 101 is used to enable corresponding pull-up transistors within output buffers $110_1$-$110_N$, such that the on-resistance of the enabled pull-up transistors within output buffers $110_1$-$110_N$ match the characteristic impedance $Z_{PCB}$ (when output buffers $110_1$-$110_N$ drive high output signals $O_1$-$O_N$). Similarly, the n-code value NCODE provided by the impedance matching logic 101 is used to enable corresponding pull-down transistors within output buffers $110_1$-$110_N$, such that the on-resistance of the enabled pull-down transistors within output buffers $110_1$-$110_N$ match the characteristic impedance $Z_{PCB}$ (when output buffers $110_1$-$110_N$ drive low output signals $O_1$-$O_N$).

During normal operation of integrated circuit chip 100, impedance matching logic 101 repeatedly re-calculates the pull-up and pull-down transistors to be enabled to approximate the resistance $R_{REF}$, to ensure consistent operation for variations in temperature and voltage. After each re-calculation, impedance matching logic 101 updates the stored p-code value PCODE and the stored n-code value NCODE. These updated p-code and n-code values are provided to output buffers $110_1$-$110_N$ in the manner described above. However, changing the p-code value and the n-code value implemented within output buffers $110_1$-$110_N$ can cause output switching, which undesirably creates noise and affects the output timing.

For example, suppose that a first p-code value $PCODE_1$ being implemented by output buffer $110_1$ specifies that a first set of pull-up transistors within output buffer $110_1$ are turned on to drive a high output signal $O_1$. Further assume that output buffer $110_1$ is in fact driving a high output signal $O_1$ at the time that the first p-code value $PCODE_1$ is updated (replaced) with a second p-code value $PCODE_2$. The second p-code value $PCODE_2$ may specify that a second set of pull-up transistors within output buffer $110_1$ are turned on to drive a high output signal $O_1$, wherein the second set of pull-up transistors is different than the first set of pull-up transistors. Under worst case conditions, updating the p-code value could result in about half of the pull-up transistors in output buffer $110_1$ being switched on, while the other half of the pull-up transistors in output buffer $110_1$ are being switched off, all while output buffer $110_1$ is driving a high output signal $O_1$. Under these conditions, significant noise is created within output buffer $110_1$.

Figure 2:
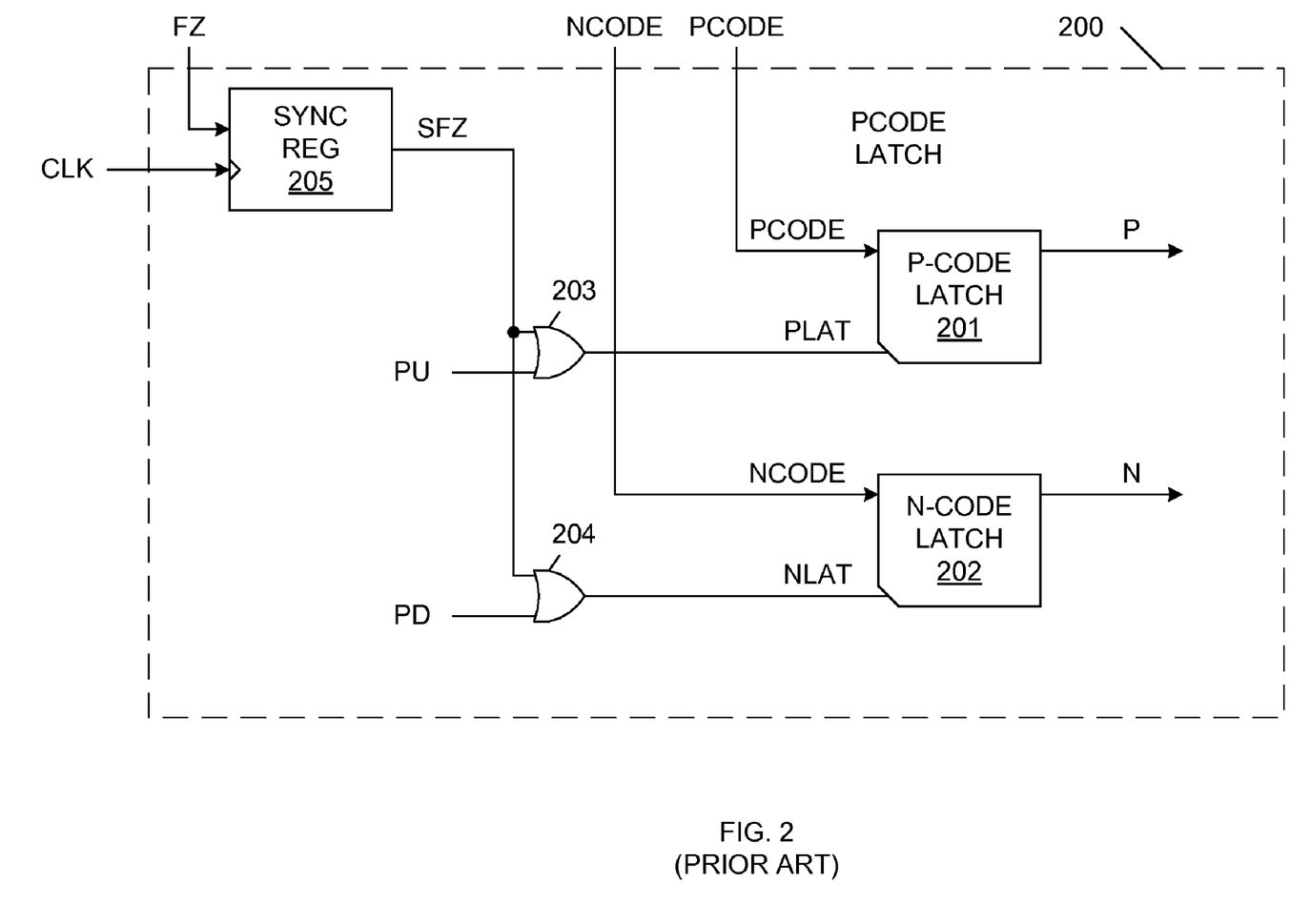
FIG. 2 is a block diagram of a circuit that has been used within the output buffer of FIG. 1 to prevent code values from being updated within the output buffer while the output buffer is driving an output signal.

FIG. 2 is a block diagram of a circuit 200 that has been used within output buffer $110_1$ to prevent the p-code value PCODE or the n-code value NCODE being implemented within output buffer $110_1$ from being changed while output buffer $110_1$ is driving an output signal $O_1$. Circuit 200 includes p-code latch 201, n-code latch 202, OR gates 203-204 and synchronization register 205. P-code latch 201 receives the p-code value PCODE from impedance matching circuit 101, and a PLAT control signal from OR gate 203. P-code latch 201 is a transparent latch that passes the received p-code value PCODE as the output p-code value P, when the PLAT control signal has a logic '0' value. When the PLAT control signal transitions to a logic '1' state, P-code latch 201 latches the p-code value PCODE received at the time of the transition, and holds this latched p-code value PCODE, regardless of any changes to the received p-code value PCODE, until the PLAT control signal transitions back to the logic '0' state. The p-code value P provided by p-code latch 201 specifies the pull-up transistors within output buffer $110_1$ that are turned on when output buffer $110_1$ drives a high output signal $O_1$.

N-code latch 202 operates in a similar manner to provide the n-code value N in response to the n-code value NCODE and the NLAT control signal provided by OR gate 204.

The PLAT and NLAT control signals are generated as follows. Impedance matching logic 101 generates a freeze control signal FZ, which is activated to a logic '1' value for a short period before and a short period after the p-code value PCODE and the n-code value NCODE are updated within impedance matching logic 101. Otherwise, the freeze control signal FZ is deactivated to a logic '0' state. Activating the freeze control signal FZ in this manner causes OR gate 203 to provide a PLAT signal having a logic '1' state while the p-code value PCODE and the n-code value NCODE code values are being updated. The FZ signal is latched into synchronization register in response to the output clock signal CLK, thereby providing a synchronized freeze signal, SFZ. The synchronized freeze signal SFZ signal is applied to input terminals of OR gates 203 and 204.

OR gates 203 and 204 also receive pull-up control signal PU and pull-down control signal PD, respectively. The pull-up control signal PU is activated to a logic '1' value when output buffer $110_1$ drives a high output signal $O_1$. Similarly, pull-down signal PD is activated to a logic '1' value when output buffer $110_1$ drives a logic low output signal $O_1$. Otherwise, the pull-up and pull-down control signals PU and PD are deactivated to a logic '0' value.

As described above, the received p-code value PCODE and the received n-code value NCODE can only be passed through the respective p-code latch 201 and n-code latch 202 while the respective signals PLAT and NLAT have logic '0' values. However, conditions may exist wherein the PLAT signal (or the NLAT signal) has a logic '1' value for an extended (or indefinite) time period, thereby preventing the output p-code value P (or the output n-code value N) from being updated. For example, suppose that while the synchronized freeze signal SFZ has a logic '0' state, the pull-up control signal PU has a logic '1' state. Further assume that the pull-up control signal PU only has a logic '0' state while the synchronized freeze signal SFZ has a logic '1' state. That is, the pull-up control signal PU only has a logic '0' value while the p-code value PCODE and the n-code value NCODE are being updated. As long as these conditions exist, the output p-code value P provided by p-code latch 201 could not change to reflect a new received p-code value PCODE.

Each time the p-code and n-code values PCODE and NCODE are calculated/re-calculated, impedance matching logic 101 switches its pull-up and pull-down transistors in the same sequence. Each switching sequence begins with the pull-up or pull-down transistors in the same high impedance configuration, and progresses to lower impedance configurations. This switching sequence therefore consistently requires a large number of cycles to calculate/re-calculate the p-code and n-code values PCODE and NCODE, even if there is little change in these code values. As a result, the update process is a lengthy process that has a significant power requirement, introduces noise, and results in electromigration within the pull-up and pull-down transistors within impedance matching logic 101.

It would therefore be desirable to have an impedance matching system that overcomes the above-described deficiencies of conventional impedance matching systems.

SUMMARY

Accordingly, the present invention provides an output buffer that stores updated p-code values and n-code values using a two-stage latch configuration, such that updated p-code values and n-code values are always stored within the output buffer.

The present invention further provides impedance matching logic that uses previously determined p-code and n-code values to shorten the switching sequence required to update the p-code and n-code values.

The present invention also provides an impedance matching logic that operates in response to a divided clock signal having a frequency lower than the frequency of the output clock signal used to control the output buffers.

The present invention further provides a method for adjusting the n-code and p-code values by certain percentages using a multiplication function, thereby allowing for design fine tuning (e.g., due to layout mismatch).

The present invention will be more fully understood in view of the following description and drawings.

DETAILED DESCRIPTION

Figure 3:
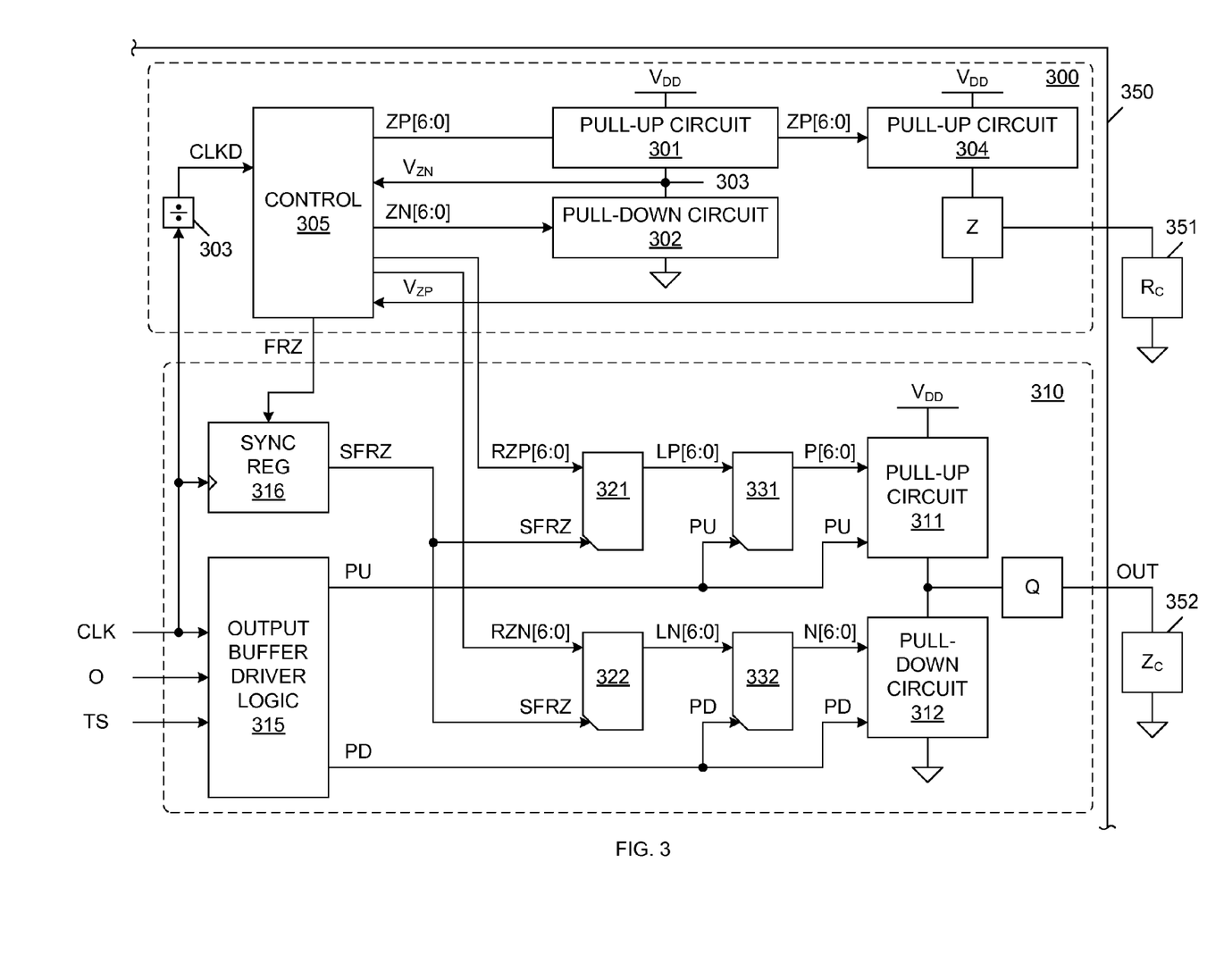
FIG. 3 is a block diagram of an integrated circuit chip which includes impedance matching logic and an output buffer in accordance with one embodiment of the present invention.

FIG. 3 is a block diagram of an integrated circuit chip 350, which includes impedance matching logic 300 and output buffer 310, in accordance with one embodiment of the present invention. Although only one output buffer 310 is illustrated in FIG. 3, it is understood that other identical output buffers may be included on chip 350, and that these other output buffers would be controlled in the same manner as output buffer 310.

Impedance matching logic 300 includes pull-up circuits 301 and 304, pull-down circuit 302, clock divider circuit 303, control logic 305 and output pin/pad Z. Pull-up circuit 304 is coupled between the $V_{DD}$ supply voltage terminal and output pin Z. Pull-up circuit 301 is coupled between the $V_{DD}$ supply voltage terminal and intermediate node 303. Pull-down circuit 302 is coupled between the intermediate node 303 and the ground supply terminal. Intermediate node 303 provides a feedback voltage $V_{ZN}$ to control logic 305. Pull-up circuits 301 and 304 are controlled by a p-code value ZP[6:0] provided by control logic 305, and pull-down circuit 302 is controlled by an n-code value ZN[6:0] provided by control logic 305. Upon determining a final p-code value ZP[6:0] and a final n-code value ZN[6:0], control logic 305 stores these final code values in internal registers, as the registered p-code value RZP[6:0] and the registered n-code value RZN[6:0]. These registered code values RZP[6:0] and RZN[6:0] are provided to output buffer 310. Output pad Z is coupled to control logic 305 in a feedback configuration, thereby enabling control logic 305 to monitor the voltage ($V_{ZP}$) developed on output pad Z. The timing of control logic 305 is controlled by a divided clock signal CLKD, which is created by dividing the output clock signal by N (wherein N is greater than 1). Divider circuit 303 divides the output clock signal CLK by N to create the divided clock signal CLKD. Control logic 305 generates a freeze control signal (FRZ), which is provided to output buffer 310. An external resistor 351 having a resistance $R_C$ is coupled to output pin Z.

Output buffer 310 includes pull-up circuit 311, pull-down circuit 312, output buffer driver logic 315, synchronization register 316, first stage code latches 321-322, second stage code latches 331-332 and output pin/pad Q. Pull-up circuit 311 is coupled between the $V_{DD}$ voltage supply terminal and output pin Q, and pull-down circuit 312 is coupled between the ground supply terminal and output pin Q. Output pin Q is coupled to external circuitry (not shown) through printed circuit board trace 352, wherein each of this trace 352 has a characteristic impedance of $Z_C$.

Output buffer driver logic 315 receives the output clock signal CLK, an output signal O and tri-state signal TS, and in response, generates a pull-up control signal PU and a pull-down control signal PD, which are synchronized with the output clock signal CLK. The pull-up control signal PU is activated to a logic '1' state to drive the output signal OUT on output pad Q to a high state ($V_{DD}$) when the output signal O has a logic '1' value, and the tri-state signal TS is de-activated. The pull-down control signal PD is activated to a logic '1' state to drive the output signal OUT on output pad Q to a low state (ground) when the output signal O has a logic '0' value, and the tri-state signal TS is de-activated. Both the pull-up control signal PU and the pull-down control signal PD are de-activated to a logic '0' state when the tri-state signal TS is activated (TS=1), such that the output signal OUT is not driven (i.e., output pin Z is not coupled to $V_{DD}$ or ground).

Synchronization register 316 receives the output clock signal CLK and the freeze control signal FRZ, and in response, provides a synchronized freeze signal (SFRZ). The registered p-code value RZP[6:0] provided by impedance matching logic 300 is latched into the first stage p-code register 321 in response to the synchronized freeze signal SFRZ. Similarly, the registered n-code value RZN[6:0] provided by impedance matching logic 300 is latched into the first stage n-code register 322 in response to the synchronized freeze signal SFRZ. The first stage p-code register 321 provides a latched p-code value LP[6:0] to second stage p-code register 331. Similarly, the first stage n-code register 322 provides a latched n-code value LN[6:0] to second stage n-code register 332. The latched p-code value LP[6:0] is latched into the second stage p-code register 331 in response to the pull-up control signal PU generated by output buffer driver logic 315. Similarly, the latched n-code value LN[6:0] is latched in to the second stage n-code register 332 in response to the pull-down control signal PD generated by output buffer logic driver 315. The second stage p-code register 331 provides a final p-code value P[6:0] to pull-up circuit 311, and the second stage n-code register 332 provides a final n-code value N[6:0] to pull-down circuit 312. When the pull-up control signal PU is activated, the pull-up circuit 311 turns on p-channel transistors identified by the final p-code value P[6:0], thereby driving the output signal OUT to a logic high state. When the pull-down control signal PD is activated, the pull-down circuit 312 turns on n-channel transistors identified by the final n-code value N[6:0], thereby driving the output signal OUT to a logic low state. As described in more detail below, the on-resistance of the then enabled p-channel transistors in pull-up circuit 311 and the on-resistance of the enabled n-channel transistors in pull-down circuit 312 are controlled to match the characteristic impedance $Z_C$ of the printed circuit board trace 352, thereby minimizing signal reflection and ringing of the output signal OUT.

Figure 4:
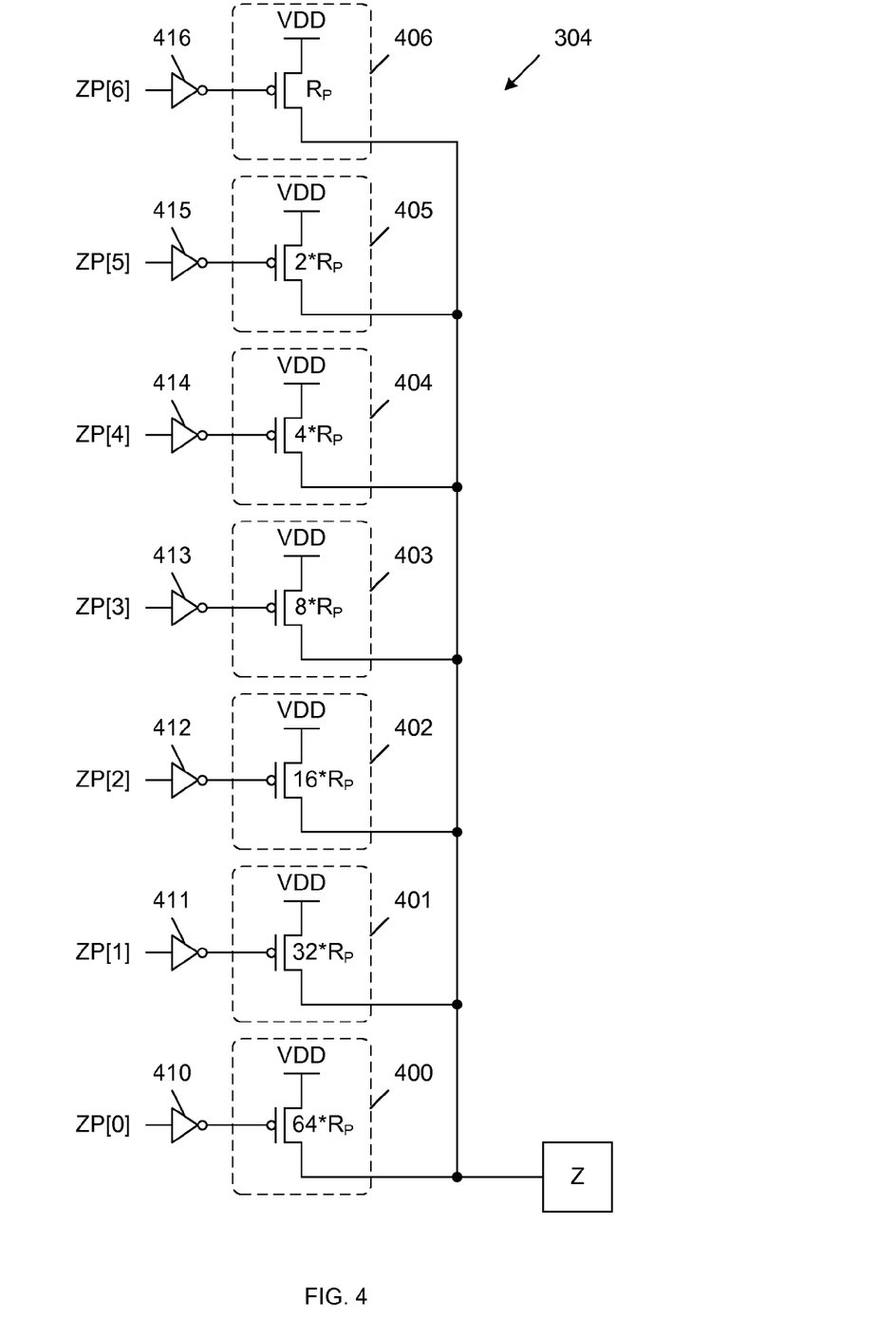
FIG. 4 is a circuit diagram illustrating pull-up transistors within the impedance matching logic of FIG. 3, in accordance with one embodiment of the present invention.

FIG. 4 is a circuit diagram illustrating the pull-up circuit 304 coupled between the $V_{DD}$ voltage supply terminal and the output pin Z within impedance matching logic 300, in accordance with one embodiment of the present invention. Pull-up circuit 301 is identical to pull-up circuit 304. Pull-up circuit 304 includes seven pull-up transistor sets 400-406 and inverters 410-416. Although pull-up transistor sets 400-406 are illustrated as single p-channel transistors in FIG. 4, it is understood that pull-up transistor sets 400-406 will typically include more than one p-channel transistor to provide the equivalent on-resistances described below.

Inverters 410-416 are coupled to receive the p-code bits ZP[0:6], respectively, from control logic 305. The output terminals of inverters 410-416 are coupled to the gates of the p-channel transistors in transistor sets 400-406, respectively. Thus, a p-code bit ZP[x] having a logic '1' value causes the p-channel transistors in the corresponding transistor set to turn on, while a p-code bit ZP[x] having a logic '0' value causes the p-channel transistors in the corresponding transistor set to turn off.

P-channel pull-up transistor set 406 has an equivalent on-resistance equal to the resistance Rp. P-channel pull-up transistor set 405 has an equivalent on-resistance equal to 2*Rp. Each subsequent P-channel pull-up transistor set doubles in equivalent on-resistance, such that p-channel pull-up transistor sets 404, 403, 402, 401 and 400 have equivalent on-resistances of 4*Rp, 8*Rp, 16*Rp, 32*Rp and 64*Rp, respectively.

In the described embodiments, pull-down circuit 302 includes seven sets of n-channel pull-down transistors (not shown) coupled between the output pin Z and ground. The seven n-channel pull-down transistor sets are configured and sized in a similar manner as pull-up transistor sets 400-406. The seven pull-down transistor sets are controlled by n-code bits ZN[6:0] in the same manner that the seven pull-up transistor sets 400-406 are controlled by the inverted p-code bits ZP[6:0].

At system reset, control logic 305 implements an initial impedance matching cycle, turning off all of the n-channel pull-down transistors in pull-down circuit 302 by setting the n-code value ZN[6:0] to a value of '0' (i.e., '0000000'), and setting the p-code value ZP[6:0] equal to '3' (i.e., '0000011'). Under these conditions, p-channel transistor sets 400-401 are turned on, and p-channel transistor sets 402-406 are turned off, thereby introducing an effective resistance of about 21.3*Rp between the $V_{DD}$ supply terminal and output pad Z. At this time, the voltage $V_Z$ developed on output pad Z is well below $V_{DD}/2$, as 21.3*Rp>>Rc.

Control logic 305 then sequentially increments the p-code value ZP[6:0] in coarse steps of '4' (e.g., '0000011' to '0000111' to '0001011' to '0001111' . . . ), until the voltage $V_{ZP}$ on output pin Z becomes greater than $V_{DD}/2$. Control logic 305 then decrements the p-code value ZP[6:0] in up to three fine steps of '1' (e.g., 'xxxxx11' to 'xxxxx10' to 'xxxxx01' to 'xxxxx00') until the voltage on output pin Z becomes less than $V_{DD}/2$. At this time, control logic 305 holds the final p-code value ZP[6:0]. The final p-code value ZP[6:0] turns on a group of the pull-up transistor sets within pull-up circuit 304, such that the on-resistance of this group of pull-up transistor sets approximates the external reference resistance $R_C$. Note that pull-up circuit 301, which also receives the final p-code value ZP[6:0], also includes a group of turned on transistor sets that exhibits an on-resistance that approximates the external reference resistance $R_C$.

Control logic 305 then controls the n-code value ZN[6:0] in a similar manner, such that the n-code value is sequentially incremented from an initial count of '3' using coarse steps of '4' until the voltage $V_{ZN}$ becomes less than $V_{DD}/2$. The n-code value is then sequentially decremented using fine steps of '1' until the voltage $V_{ZN}$ becomes greater than $V_{DD}/2$. At this time, control logic 305 holds the final n-code value ZN[6:0]. The final n-code value ZN[6:0] turns on a group of the n-channel transistor sets within pull-down circuit 302, such that the on-resistance of this group of n-channel transistor sets approximates the on-resistance of pull-up circuit 301 (and pull-up circuit 304), and therefore, the external reference resistance $R_C$.

When the initial impedance matching cycle is completed, the final p-code value ZP[6:0] and the final n-code value ZN[6:0] are stored (registered) into internal registers within control logic 305 as registered code values RZP[6:0] and RZN[6:0], respectively. The final code values ZP[6:0] and ZN[6:0] are registered in response to an edge of the divided clock signal CLKD. Control logic 305 activates the freeze signal FRZ to a logic '1' state for one cycle of the divided clock signal CLKD, wherein the freeze signal FRZ transitions from a logic '0' state to a logic '1' state one half cycle of the divided clock signal CLKD before the final code values ZP and ZN are registered as the code values RZP and RZN, and wherein the freeze signal FRZ transitions from the logic '1' state to a logic '0' state one half cycle of the divided clock signal CLKD after the final code values ZP and ZN are registered as the code values RZP and RZN. In the described embodiment, the divided clock signal CLKD has a frequency of about 25 MHz and the output clock signal CLK has a frequency of about 200 MHz (i.e., N=8), such that the freeze signal FRZ is activated for about 8 cycles of the output clock signal CLK.

The activated freeze signal FRZ is latched into synchronization register 316 in response to a rising (or falling) edge of the output clock signal CLK, thereby causing the synchronized freeze signal SFRZ to transition to a logic '1' value. In response to the logic '1' state of the synchronized freeze signal SFRZ, the first stage p-code latch 321 and the first stage n-code latch 322 each transition to a 'closed' state. In the closed state, first stage latches 321 and 322 hold the registered code values RZP[6:0] and RZN[6:0], respectively, that were being received at the time that the synchronized freeze signal SFRZ transitioned to the logic '1' state. Freezing the first stage latches 321 and 322 in this manner guarantees about 4 CLK cycles of setup & hold time from the time that the synchronized freeze signal SFRZ transitions to a logic '1' value until the final code values ZP and ZN are latched as the new registered code values RZP and RZN.

When the freeze signal FRZ is subsequently de-activated to the logic '0' state, the output clock signal CLK causes this de-activated freeze signal FRZ to be latched into synchronization register 316, thereby causing the synchronized freeze signal SFRZ to transition to a logic '0' value. In response to this transition of the synchronized freeze signal SFRZ, the first stage p-code latch 321 and the first stage n-code latch 322 each transition to an 'open' state. Upon transitioning to the open state, the newly registered final code values RZP[6:0] and RZN[6:0] are moved into the first stage latches 321 and 322, respectively, and are provided as the code values LP[6:0] and LN[6:0], respectively. These newly updated code values LP[6:0] and LN[6:0], will be provided as outputs of the first stage latches 321 and 322 until the next time that the synchronized freeze signal SFRZ transitions to a logic '0' state. It is important to note that the registered code values RZP[6:0] and RZN[6:0] are stored in the respective first stage latches 321 and 322 as latched code values LP[6:0] and LN[6:0], respectively, after each impedance matching cycle, regardless of the status of the pull-up control signal PU and the pull-down control signal PD. The timing described above ensures that the code values LP[6:0] and LN[6:0] provided by the first stage latches 321 and 322 are either newly registered final code values or previously registered final code values, but not a combination of both. Moreover, the synchronized nature of the SFRZ signal can guarantee a set up & hold time of the latched code value LP[6:0] with respect to the rising edge of the pull-up control signal PU, and a set up & hold time of the latched code value LN[6:0] with respect to the rising edge of the pull-down control signal PD.

The latched p-code value LP[6:0] and the latched n-code value LN[6:0] are applied to input terminals of the second stage p-code latch 331 and the second stage n-code latch 332, respectively. The second stage latches 331 and 332 are controlled by the pull-up and pull-down control signals PU and PD, respectively. When the pull-up control signal PU is in a logic '0' state (i.e., the pull-up circuit 311 is not activated to drive a high output signal OUT), the second stage p-code latch 331 is in an 'open' state. Similarly, when the pull-down control signal PD is in a logic '0' state (i.e., the pull-down circuit 312 is not activated to drive a low output signal OUT), the second stage n-code latch 332 is in an 'open' state. In the open states, the second stage latches 331 and 332 pass the respective latched code values LP[6:0] and LN[6:0] as the code values P[6:0] and N[6:0], respectively.

When the pull-up control signal PU is in a logic '1' state (i.e., the pull-up circuit 311 is activated to drive a high output signal OUT), the second stage p-code latch 331 is in a 'closed' state. Similarly, when the pull-down control signal PD is in a logic '1' state (i.e., the pull-down circuit 312 is activated to drive a low output signal OUT), the second stage n-code latch 332 is in a 'closed' state. Upon transitioning to the closed state, the second stage latches 331 and 332 hold the latched code values LP[6:0] and LN[6:0] received at the time of the transition, and continue to provide these 'held' code values as the code values P[6:0] and N[6:0], respectively. While the second stage latches 331 and 332 remain in the closed state, the code values P[6:0] and N[6:0] will not change, even if the latched code values LP[6:0] and LN[6:0] change.

Controlling the code values P[6:0] and N[6:0] in the above-described manner ensures that the code values P[6:0] and N[6:0] may only change during inactive periods of the pull-up circuit 311 and pull-down circuit 312, respectively. As a result, switching noise due to updating the p-code value P[6:0] or the n-code value N[6:0] is eliminated within pull-up circuit 311 and pull-down circuit 312. Moreover, the p-code value P[6:0] is advantageously updated immediately prior to each activation of the pull-up control signal PU, and the n-code value N[6:0] is advantageously updated immediately prior to each activation of the pull-down control signal PD.

In an alternate embodiment of the present invention, the first stage latches 321 and 322 are eliminated, and transitions of the p-code value RZP[6:0] and transitions of the n-code value RZN[6:0] are controlled to have sufficient clearance with respect to the pull-up and pull-down signals PU and PD, respectively (i.e., the set-up and hold time of the second set of latches is never violated by RZP[6:0] and RZN[6:0]). In order to achieve the desired timing, the CLK-to-RZP delay and the CLK-to-RZN delay must be controlled for every output pad, such that there is enough clearance to both the CLK-to-PU delay and the CLK-to-PD delay. For a lower frequency CLK signal, this is easily achievable by providing an adjustable delay in clock divider 303.

Figure 5:
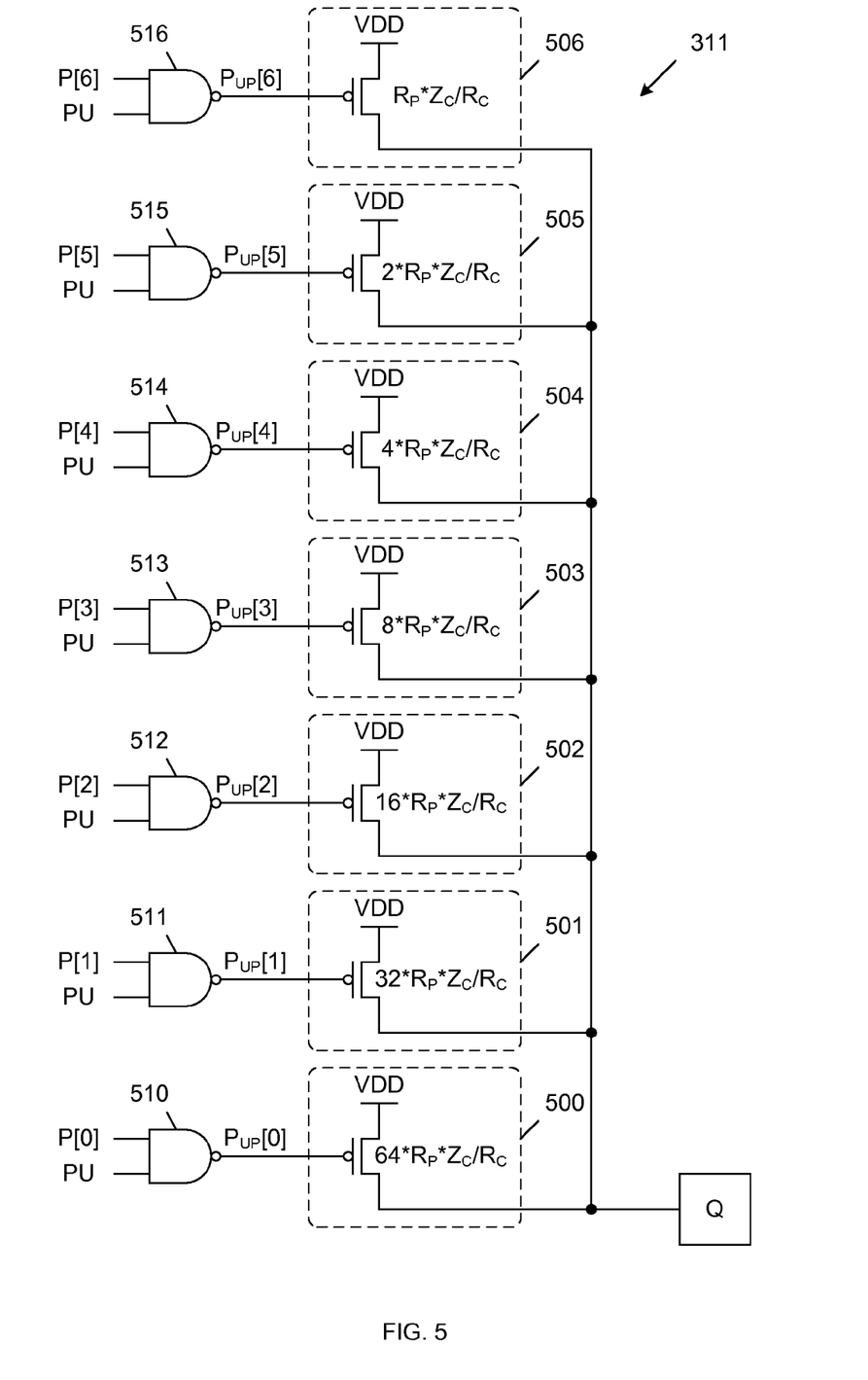
FIG. 5 is a circuit diagram illustrating a pull-up circuit within the output buffer of FIG. 3, in accordance with one embodiment of the present invention.

FIG. 5 is a circuit diagram illustrating pull-up circuit 311 coupled between the $V_{DD}$ voltage supply terminal and the output pin Q within output buffer 310, in accordance with one embodiment of the present invention. Pull-up circuit 311 includes NAND gates 510-516, which are coupled to receive the p-code bits P[0:6], respectively. Each of the NAND gates 510-516 also receives the pull-up control signal PU. In response, NAND gates 510-516 provide pull-up bits $P_{UP}$[0:6], respectively.

Pull-up circuit 311 also includes a plurality of p-channel pull-up devices, which are grouped into seven sets 500-506. Pull-up device sets 500-506 are controlled by the pull-up signals $P_{UP}$[0:5], respectively. Thus, the pull-up device sets 500-506 can only be turned on when the pull-up control signal PU is activated to a logic '1' state, and the corresponding p-code bit P[x] has a logic '1' value.

The pull-up device sets 500-506 of pull-up circuit 311 have the same configuration as the pull-up device sets 400-406, respectively, (FIG. 4) of pull-up circuit 304. In the described embodiment, the resistance $R_C$ is set as a multiple of Zc (typically, Rc=5*Zc) to control the output buffer resistance to be Zc. Thus, each of p-channel pull-up sets 502-506 has an equivalent on-resistance equal to Zc/Rc (e.g., ⅕) times the on-resistance of corresponding pull-up sets 400-406 in pull-up circuit 304.

By using the p-code value P[6:0] to control pull-up device sets 500-506, the on-resistance of the pull-up circuit 311 will approximate the characteristic impedance $Z_C$. Similarly, by using the n-code value N[6:0] to control corresponding transistor sets in pull-down circuit 312, the on-resistance of the pull-down circuit 311 will also approximate the characteristic impedance Zc.

After control logic 305 de-activates the freeze control signal FRZ to a logic '0' state, control logic 305 initiates another (i.e., second) impedance matching cycle, wherein the p-code value ZP[6:0] and the n-code value ZN[6:0] are re-calculated. This subsequent impedance matching cycle is intended to identify any changes in the code values ZP[6:0] and ZN[6:0], which may occur due to variations in temperature or voltage.

In accordance with one embodiment of the present invention, all of the impedance matching cycles after the initial impedance matching cycle are performed in the following manner. Rather than initially setting the p-code value ZP[6:0] equal to '3' (as in the initial impedance matching cycle), control logic 305 selects the initial p-code value ZP[6:0] in response to the registered p-code value RZP[6:0] determined in a previous impedance matching cycle. In one embodiment, the initial p-code value of each impedance matching cycle can be selected using the following equation.

$$\text{initial code}=3+\max(0,\text{old\_code}[6:2]-\text{back\_tick})*4 \quad (1)$$

At system reset, the old_code value is set to '0' (i.e., old_code[6:2]='00000'), such that the initial impedance matching cycle starts at an initial code value of '3' (ZP[6:0]='0000011') in the manner described above. This allows the initial impedance matching cycle to traverse the full range of on-resistances offered by pull-up circuit 301. The back_tick value, which is preferably set to equal '1' or '2', controls the maximum amount the code can decrease from one impedance matching cycle to the next.

For example, suppose that the final p-code value RZP[6:0] determined in the initial impedance matching cycle was '1000110', and that back_tick value is equal to '2'. Given these values, old_code[6:2] would be equal to '10001', resulting in an initial code value of '0111111' for the second impedance matching cycle. Note that this initial code value of '0111111' is less than the final p-code value of '1000110' determined during the initial impedance matching cycle. It is therefore expected that the application of the initial code value of '0111111' to pull-up circuit 301 will result in a voltage $V_{ZP}$ on output pin Z that is less than $V_{DD}/2$.

After applying the initial code value (ZP[6:0]='0111111') to pull-up circuit 301, control logic 305 senses the voltage $V_{ZP}$ on output pin Z. If this voltage $V_{ZP}$ is unexpectedly greater than $V_{DD}/2$, control logic decreases the code value in fine steps of '1' (i.e., '0111111' to '0111110' to '0111101' to '0111100') until the voltage $V_{ZP}$ becomes less than $V_{DD}/2$. If the voltage $V_{ZP}$ does not become less than $V_{DD}/2$, then control logic 305 subtracts '1' from the last code value (i.e., '0111011') to determine the new final p-code value RZP[6:0]. This improves the quantization error of impedance matching logic 300.

However, if control logic 305 senses that the voltage $V_{ZP}$ on output pin Z is less than $V_{DD}/2$ when the initial code value (ZP[6:0]='0111111') is applied to pull-up circuit 301, then control logic 305 increments the p-code value in coarse steps of '4' until the voltage $V_{ZP}$ becomes greater than $V_{DD}/2$. Upon detecting that the voltage $V_{ZP}$ becomes greater than $V_{DD}/2$, control logic 305 reduces the p-code value in fine steps of '1' until the voltage $V_{ZP}$ becomes less than $V_{DD}/2$ or until fine steps decrement has repeated 4 times. At this time, control logic 305 holds the p-code value ZP[6:0] as the final p-code value of the current impedance matching cycle.

Although the selection of the initial code for impedance matching cycles has been described in connection with the previously registered p-code value RZP[6:0], it is understood that the initial code for the n-code value ZN[6:0] can be selected using the previously registered n-code value RZN[6:0] in the same manner.

By selecting the initial code value in the above-described manner, the average number of steps required to complete an impedance matching cycle is significantly reduced. Reducing the number of steps required to complete an impedance matching cycle advantageously results in power savings within impedance matching logic 300. Reducing the number of steps required to complete an impedance matching cycle also improves the electromigration performance of the transistors in pull-up circuits 301 and 304 and pull-down circuit 302, because the average current flowing through these transistors is reduced as the time required to determine the final codes is reduced.

As described above, control logic 305 includes voltage sensing circuitry that compares the voltages $V_{ZP}$ & $V_{ZN}$ with a reference voltage of $V_{DD}/2$. The analog nature of such voltage sensing circuitry renders this circuitry susceptible to noise in the power supply system and noise coupled to the output pad Z. Reducing the average number of steps required to complete an impedance matching cycle reduces the noise coupled to the output pad Z, thereby improving the noise immunity of the voltage sensing circuitry within control logic 305. Abrupt erroneous impedance change due to noise can be reduced by limiting the maximum number of code changes for any particular impedance matching cycle. In one embodiment, the maximum value (max_code) of the final code value for any impedance matching cycle performed after the initial impedance matching cycle is limited by the following equation.

$$\text{max\_code}=3+\max(0,\text{old\_code}[6:2]+\text{back\_tick})*4 \quad (2)$$

Limiting the maximum value of the final code value in the manner defined by equation (2) will limit the code change for any corresponding impedance matching cycle to a maximum of (back_tick*4)+3. Applying equation (2) to the example described above (old_code='1000110', back_tick='2', and initial_code='0111111') provides a maximum code value of '1001111' for the associated impedance matching cycle. The maximum code change for a back_tick value of '2' is eleven (i.e., (2*4)+3). However, the difference between maximum code value and the old code value is only 9 in the present example, because the fine bits of the old code value are '10' instead of '00'. Note that if the code value is incremented to the maximum code value (max_code), but the sensed voltage $V_Z$ has not become greater than $V_{DD}/2$, then control logic 305 holds the maximum code value as the final code value of the current impedance matching cycle.

Limiting the maximum number of code changes for any impedance matching cycle performed after the initial impedance matching cycle in the above-described manner advantageously improves the noise immunity of the voltage sensing circuitry within control logic 305.

Note that the initial p-code values selected after the initial impedance matching cycle will cause the voltage $V_{ZP}$ on the output pin Z to transition from a voltage of about 0 Volts to a voltage of about $V_{DD}/2$. The voltage $V_{ZP}$ must be allowed to settle for a sufficient time period before the voltage sensing circuitry within control logic 305 can accurately compare this voltage with the reference voltage of $V_{DD}/2$. The waiting period for the first sensing operation of each impedance matching cycle performed after the initial impedance matching cycle must therefore be extended to ensure proper sensing. The waiting period can be calculated in response to the worst case capacitance of the output pin Z, the effective resistance coupled to output pin Z, and the maximum voltage error allowed during the sensing operation. For example, assume that the worst capacitance of output pin Z is about 200 pF, the effective resistance coupled to output pin Z when the voltage $V_{ZP}$ is equal to $V_{DD}/2$ is about 35 Ohms (i.e., 70 Ohms/2), and the maximum voltage error allowed during the sensing operation is 0.2%. In this case, the required wait time (t) could be defined by the following equation.

$$0.002*V_{DD} < \tfrac{1}{2}V_{DD}*e^{(-t/(35\ Ohms*200\ pF))} \quad (3)$$

The solution to equation (3) indicates that the wait time (t) for the initial sensing operation should be at least 39 nanoseconds (nsec) to achieve the desired voltage sensing accuracy. In contrast, the wait time for the subsequent sensing operation, wherein the voltage $V_{ZP}$ changes by an amount defined by a step change in the code value, would only have to be about 27 nsec to achieve the desired sensing accuracy if $V_{ZP}$ is already within 80% of $V_{DD}/2$.

In accordance with one embodiment of the present invention, the divided clock signal CLKD is selected to have a period that is at least as long as the required wait time associated the initial sensing operation. In the present example, the divided clock signal CLKD has a period of at least 39 nsec. Stated another way, the divide by value N implemented by clock divider circuit 303 is selected such that N times the period of the output clock signal CLK is greater than or equal to the wait period associated with the initial sensing operation. The period of the divided clock signal CLKD is then used to time the wait period between all successive sensing operations within control logic 305. An alternative approach is to wait 2 cycles of the divided clock signal CLKD for the initial sensing operation, and 1 cycle of the divided clock signal for the successive sensing operations. In this alternate embodiment, the value of N is selected such that the period of the divided clock signal provides sufficient time to complete each of the successive sensing operations. Selecting the divided clock signal CLKD in this manner simplifies the required logic within control logic 305, and also results in power savings within impedance matching logic 300.

In accordance with another embodiment of the present invention, minor changes to the registered p-code value RZP[6:0] (and the registered n-code value RZN[6:0]) across consecutive impedance matching cycles are ignored. That is, if a newly calculated final p-code value changes less than a certain percentage with respect to the previously registered p-code value, then the newly calculated final p-code value is not stored as the registered p-code value RZP[6:0]. This results in power savings within chip 350, and eliminates minor code oscillation due to noise or quantization error in sensing. In accordance with one embodiment, the decision to update or not update is decided based on the following formula.

$$|(new\_code-old\_code)|/new\_code < error\ tolerance \quad (4)$$

For example, the old_code may be updated only if the code change is greater than the most significant 2 bits of the new_code. Thus, for new_code values in the range of 0000000 to 0011111, an update is performed for any code changes. For new_code values in the range of 0100000 to 0111111, updates are performed for any code change greater than '1'. For new code values in the range of 1000000 to 1011111, updates are performed for any code change greater than '2'. For new code values in the range of 1100000 to 1111111, updates are performed for any code change greater than '3'. In this example, the maximum error introduced by skipping an update is $\tfrac{1}{2}^{(M-2)}$, where M is the total number of bits in the code. In the present example, M=7, such that the maximum error introduced by skipping a code update is about 3.1%.

In accordance with another embodiment of the present invention, the final p-code value ZP[6:0] and the final n-code value ZN[6:0] can be adjusted in response to fuse or register programmable control signals, before being stored as the registered p-code value RZP[6:0] and the registered n-code value RZN[6:0], respectively. In this embodiment, the adjustments introduced by the fuse/register programmable control signals are selected to implement design fine tuning (e.g., due to layout mismatch). In accordance with one embodiment, the final code values ZP[6:0] and ZN[6:0] are adjusted by a multiplication function, such that the provided compensation will track with variations in voltage, temperature and code value. In one embodiment, the final code values ZP[6:0] and ZN[6:0] are modified on a percentage basis in response to the selected control signal. For example, the final p-code value ZP[6:0] may be modified by a 3-bit control signal ctrl[2:0] in accordance with the following instructions. (The final n-code value ZN[6:0] can be adjusted in the same manner as the final p-code value ZP[6:0]).

PRODUCT=ctrl[1:0]*(ZP[6:5]+1)
 if ctrl[2]=0, then RESULT=ZP+PRODUCT
 else, RESULT=ZP−PRODUCT
 Adjusted ZP code=RESULT with value limited between 0 &7F (hex)
  i.e. Adjusted ZP code=0 if Result<0
  =7F (hex) if Result>7F (hex)

The number of bits of the final p-code value ZP[6:0] used in the PRODUCT calculation (e.g., '2' in the present example) determines the maximum percentage adjustment, and the number of bits in the control signal (ctrl) (e.g., '3' in the present example) deteriminates the resolution of the adjustment. Note that the 'Adjusted ZP code' is stored as the registered p-code value RZP[6:0] in the present embodiment.

If the control signal ctrl[2:0] has a value of '111', the final p-code value ZP[6:0] will be: decremented by '3' for final p-code values in the range of 0000000 to 0011111; decremented by '6' for final p-code values in the range of 0100000 to 0111111; decremented by '9' for final p-code values in the range of 1000000 to 1011111; and decremented by '12' for final p-code values in the range of 1100000 to 1111111.

If the control signal ctrl[2:0] has a value of '001', the final p-code value ZP[6:0] will be: incremented by '1' for final p-code values in the range of 0000000 to 0011111; incremented by '2' for final p-code values in the range of 0100000 to 0111111; incremented by '3' for final p-code values in the range of 1000000 to 1011111; and incremented by '4' for final p-code values in the range of 1100000 to 1111111.

In this manner, the final p-code value ZP[6:0] can be adjusted up or down in response to the control signal ctrl[2:0]. The magnitude of the adjustment tracks with the magnitude of the final p-code value ZP[6:0], such that the adjustment may be viewed as a percentage-based adjustment.

Although the present invention has been described in connection with various embodiments, it is understood that variations of these embodiments would be obvious to one of ordinary skill in the art. Thus, the present invention is limited only by the following claims.

I claim:

1. An impedance matching system comprising:
   impedance matching logic that calculates a first code value that specifies a first set of transistors to be enabled to drive an output signal, and activates a control signal upon completing calculating the first code value;
   an output buffer coupled to receive the first code value and the control signal from the impedance matching logic, wherein the output buffer includes:
      a first latch that stores the first code value received from the impedance matching logic in response to the activated control signal;
      a second latch coupled to receive the first code value stored in the first latch, wherein the second latch stores this received first code value in response to a first output control signal; and
      a first plurality of output transistors that drive an output signal to a first state in response to the first code value stored in the second latch and the first output control signal.

2. The impedance matching system of claim 1, wherein the output control signal is a pull-up control signal, and the plurality of output transistors comprise a plurality of p-channel transistors configured to pull-up the output signal to a logic high voltage.

3. The impedance matching system of claim 1, wherein the output control signal is a pull-down control signal, and the plurality of output transistors comprise a plurality of n-channel transistors configured to pull-down the output signal to a logic low voltage.

4. The impedance matching system of claim 1,
   wherein the impedance matching logic also calculates a second code value that specifies a second set of transistors to be enabled to drive the output signal, and activates the control signal upon completing calculating the first code value and second code value;
   and wherein the output buffer is further coupled to receive the second code value from the impedance matching logic, wherein the output buffer further includes:
      a third latch that stores the second code value received from the impedance matching logic in response to the activated control signal;
      a fourth latch coupled to receive the second code value stored in the third latch, wherein the third latch stores this received second code value in response to a second output control signal; and
      a second plurality of output transistors that drive the output signal to a second state in response to the second code value stored in the fourth latch and the second output control signal.

5. The impedance matching system of claim 1, wherein the first code value is selected such that the first set of transistors has an on-resistance that matches a characteristic impedance driven by the output buffer.

6. The impedance matching system of claim 1, wherein the output buffer further comprises a register that latches the activated control signal in response to an output clock signal, wherein the first latch is controlled by the latched activated control signal.

7. The impedance matching system of claim 6, wherein the output clock signal is used to drive the first output control signal.

8. An impedance matching system comprising:
   an output buffer that drives an output signal in synchronism with a first clock signal having a first frequency; and
   impedance matching logic that calculates a first code value that specifies a first set of transistors to be enabled within the output buffer to drive the output signal, wherein the impedance matching logic calculates the first code value in synchronism with a second clock signal having a second frequency, wherein the first frequency is greater than the second frequency.

9. The impedance matching system of claim 8, further comprising a clock divider circuit that generates the second clock signal in response to the first clock signal.

10. The impedance matching system of claim 8, wherein the impedance matching logic calculates the first code value by performing a series of one or more sensing operations, wherein each of the sensing operations is completed during a single cycle of the second clock signal.

11. A method of performing impedance matching comprising:
   performing a plurality of impedance matching cycles, including an initial impedance matching cycle and one or more subsequent impedance matching cycles;
   during each of the impedance matching cycles, sequentially enabling transistors within a first plurality of transistors until the enabled transistors have an on-resistance that approximates a characteristic resistance;
   during each of the impedance matching cycles, generating a sequentially changing code value to sequentially enable the transistors within the first plurality of transistors;
   during the initial impedance matching cycle, initializing the code value to a minimum code value; and
   during the one or more subsequent impedance matching cycles, initializing the code value in response to a final code value determined during a previous impedance matching cycle.

12. A method of performing impedance matching comprising:
   performing a first impedance matching cycle by incrementing a code value from a predetermined minimum value, enabling transistors within a group of transistors in response to the code value, and determining a first final code value when an on-resistance of the enabled transistors within the group of transistors approximates a characteristic resistance; then
   determining a first adjusted code value in response to the first final code value; and then performing a second impedance matching cycle by incrementing the code value from the first adjusted code value, enabling transistors within the group of transistors in response to the code value, and specifying a second final code value when an on-resistance of the enabled transistors within the group of transistors approximates the characteristic resistance.

13. The method of claim 12, wherein performing the first and second impedance matching cycles comprises incrementing the code value in coarse steps until the on-resistance of the enabled transistors becomes less than the characteristic resistance, and then decrementing the code value in fine steps until the on-resistance of the enabled transistors becomes greater than the characteristic resistance.

14. The method of claim 13, wherein the coarse steps increment the code value by four, and the fine steps decrement the code value by one.

15. The method of claim 13, further comprising determining the first adjusted code value such that the first adjusted code value is not more than N coarse steps less than the first final code value, wherein N is an integer equal to 1 or 2.

16. The method of claim 13, wherein the first adjusted code value is less than the first final code value by at least one coarse step, by not more than two coarse steps.

17. The method of claim 12, further comprising performing a plurality of additional impedance matching cycles after the second impedance matching cycle, wherein each of these additional impedance matching cycles begin incrementing the code value from an initial code value that is selected in response to a final code value determined during a previous impedance matching cycle.

18. A method of performing impedance matching comprising:
performing a plurality of successive impedance matching cycles, wherein at the end of each of the impedance matching cycles, a final code value is determined, wherein the final code value defines a group of transistors to be enabled to drive an output signal in an output buffer;
storing a final code value in the output buffer;
determining a difference between the final code value of a current impedance matching cycle and the final code value stored in the output buffer; and
determining whether or not to replace the final code value stored in the output buffer with the final code value of the current impedance matching cycle in response to the difference.

19. The method of claim 18, further comprising:
replacing the final code value stored in the output buffer with the final code value of the current impedance matching cycle if the difference is non-zero and the final code value of the current impedance matching cycle exists within a first range of code values.

20. The method of claim 19, further comprising:
replacing the final code value stored in the output buffer with the final code value of the current impedance matching cycle if the difference is greater than one and the final code value of the current impedance matching cycle exists within a second range of code values.

21. The method of claim 20, further comprising:
replacing the final code value stored in the output buffer with the final code value of the current impedance matching cycle if the difference is greater than two and the final code value of the current impedance matching cycle exists within a third range of code values.

22. The method of claim 21, further comprising:
replacing the final code value stored in the output buffer with the final code value of the current impedance matching cycle if the difference is greater than three and the final code value of the current impedance matching cycle exists within a fourth range of code values.

23. The method of claim 22, wherein the fourth range includes code values greater than the code values of the third range, the third range includes code values greater than the code values of the second range, and the second range includes code values greater than the code values of the first range.

* * * * *